M. A. HOWE.
AUTOMOBILE SAFETY APPLIANCE.
APPLICATION FILED FEB. 15, 1909.

935,108.

Patented Sept. 28, 1909.
3 SHEETS—SHEET 1.

Witnesses:

Inventor
Mortimer A. Howe
By
Attorney

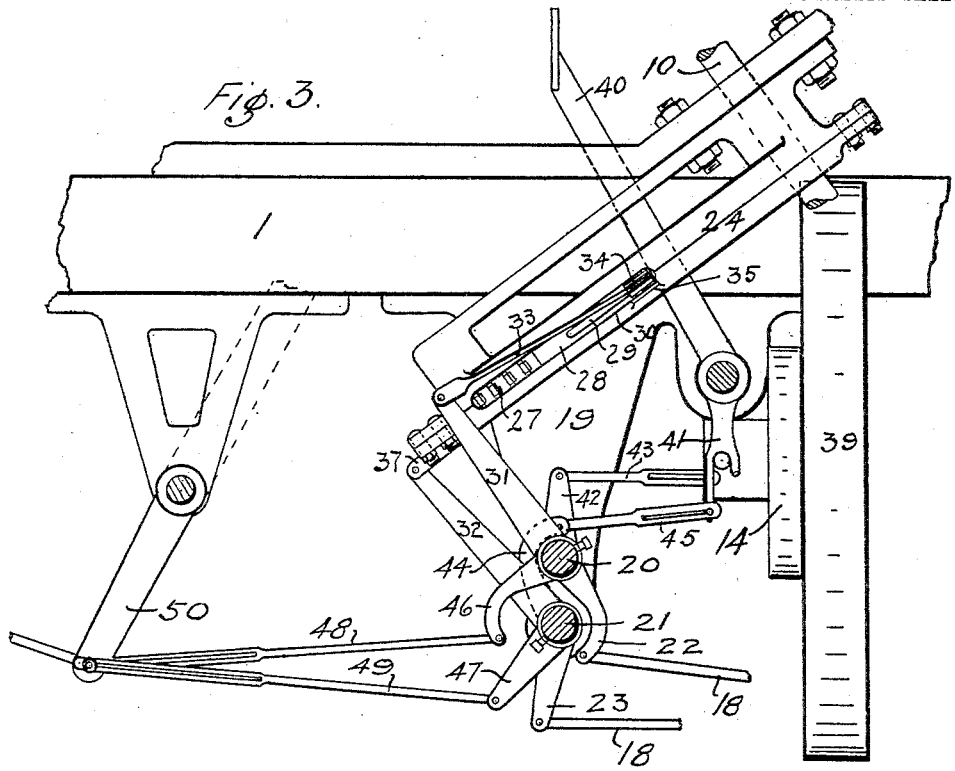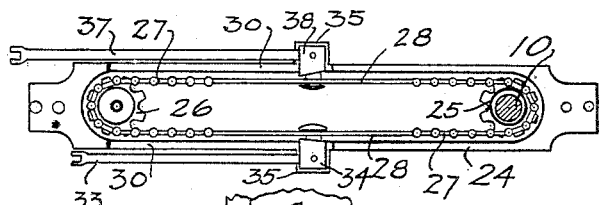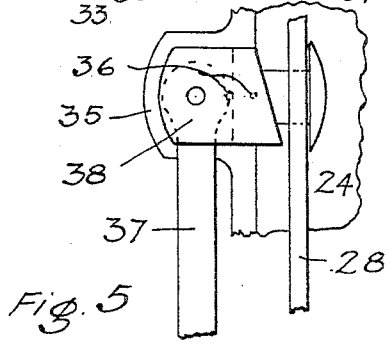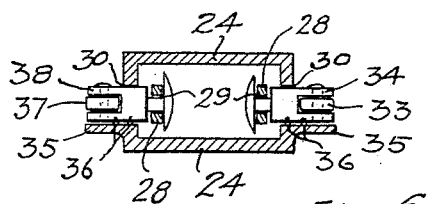

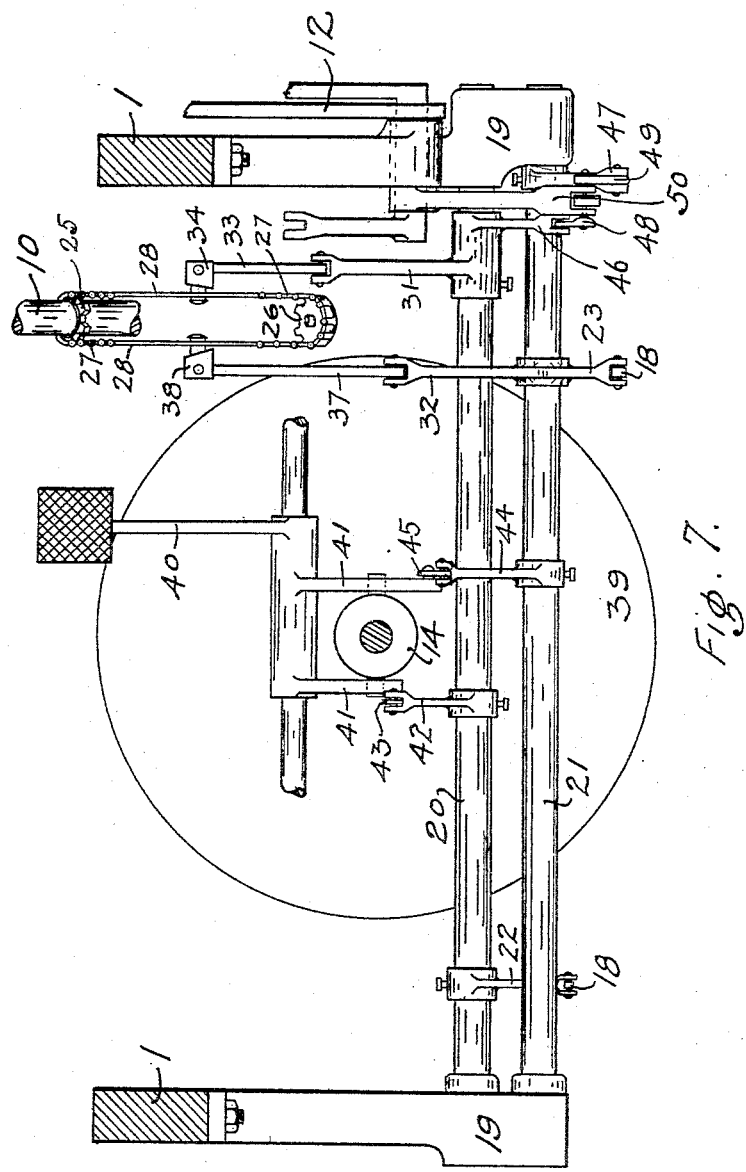

UNITED STATES PATENT OFFICE.

MORTIMER A. HOWE, OF TACOMA, WASHINGTON.

AUTOMOBILE SAFETY APPLIANCE.

935,108.  Specification of Letters Patent.  Patented Sept. 28, 1909.

Application filed February 15, 1909.  Serial No. 478,008.

*To all whom it may concern:*

Be it known that I, MORTIMER A. HOWE, a citizen of the United States of America, residing at Tacoma, in the county of Pierce and State of Washington, have invented certain new and useful Improvements in Automobile Safety Appliances, of which the following is a specification, reference being had therein to the accompanying drawing.

This invention relates to automobiles and especially to devices for increasing the safety thereof, and has for its object to provide means whereby the automobile is automatically steered away from the point of danger and is automatically stopped before any great damage can occur.

My invention is illustrated in the accompanying drawings in which—

Figure 1:
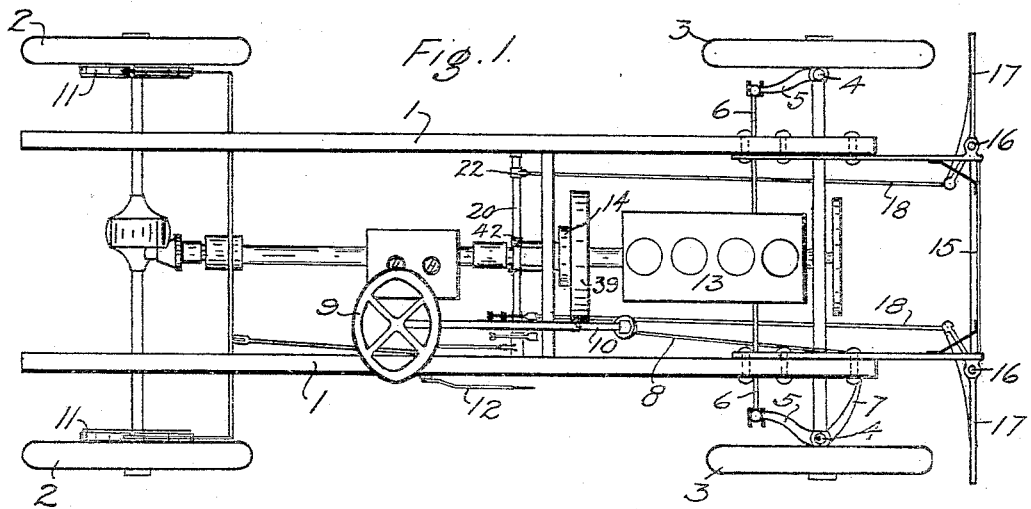
Figure 2:
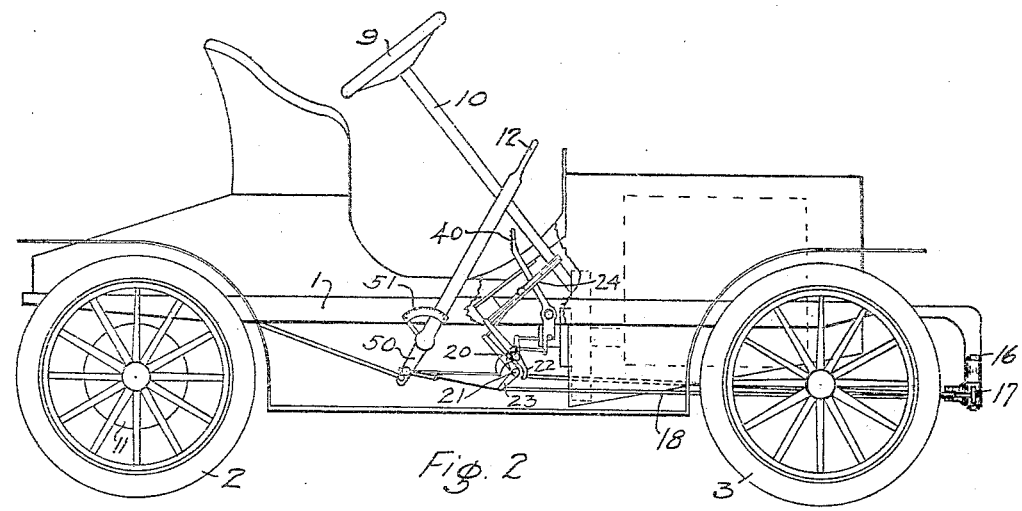

Figure 1 is a plan view of the chassis of an automobile equipped with my safety appliances; Fig. 2 is a side elevation of such an automobile a portion of the side thereof being broken away to show the position of the said appliances therein; Fig. 3 is a side elevation of a portion of the said safety appliances on a larger scale, showing the same mounted on the frame of the chassis; Fig. 4 is a plan of the automatic steering mechanism, the upper part of the containing box or frame having been removed to reveal the working parts thereof; Fig. 5 is a plan of a portion of the said steering mechanism, showing the gripping device; Fig. 6 is a cross-section of the box containing the said steering mechanism; and Fig. 7 is a rear elevation of a portion of the said safety appliances.

Similar numerals of reference refer to similar parts throughout the several views.

This invention is occasioned by a class of accidents which are often of fatal termination, in which the automobile strikes an obstruction with one of the steering wheels and the said obstruction draws the machine toward it; for instance, the right wheel, or the hub thereof, may catch in one of the posts of the railing of a bridge and the post will tend to steer the machine toward it so that it will very likely tip over the edge of the bridge. With this in view I have invented an automatic device which, when it is touched by an object which the machine approaches too closely, will steer the machine over to the other side away from the obstruction and will simultaneously apply the brake and release the clutch connecting the engine with the transmission mechanism, thus automatically bringing the machine to a quick stop.

The machine illustrated in the drawings has two side frames 1 mounted on suitable rear driving wheels 2 and suitable front steering wheels 3 which are operated in the usual manner by being mounted on knuckles 4 which are connected together by means of the arms 5 and the connecting rod 6, and which are operated by means of the lever 7 and steering rod 8, which in turn are operated by turning the steering wheel 9 mounted on the upper end of the steering post 10. Suitable brakes 11 are applied to the rear wheels or to any part of the machine directly connected therewith, and are normally operated by means of a hand lever 12, which is connected to the said brakes 11 by means of suitable rods and other mechanism. The automobile is driven by an engine 13 suitably mounted thereon, through a friction clutch 14, or any other suitable means.

The above parts are in no way novel but are parts of an automobile as at present constructed, and are here mentioned because reference thereto will be necessary in describing my invention. Further, the form, position or design of any or all of the above described parts, or of the machine itself, make no material difference to the spirit of my invention which may be applied to any design or make of machine, by correspondingly changing the position or form or action of corresponding parts of my invention. Further some makes of machines may eliminate some of the above described parts, and in that case the part of my invention corresponding thereto will have to be altered to suit the circumstances.

Coming now to the description of my invention as illustrated in the accompanying drawings, I would state that it consists of four sets of mechanisms, all acting together to avert an accident. These four sets of mechanisms are, first, the mechanism which is engaged by the obstruction and which operates all the other sets of mechanism through the force of the contact thereof with the obstruction, (this set of mechanism corresponds with the feelers or whiskers of a cat or other carnivorous animal;) second, the mechanism by means of which the machine is steered away from the side which has been engaged by the obstruction; third, the mechanism by means of which the connection between the driving engine and the driven wheels of the machine is broken; and fourth, the mechanism by means of which the brake is set to stop the rotation of the wheels.

Coming then to the first set of mechanisms, namely that set which acts as a feeler for the machine and which actuates the other mechanisms. To the two side frames 1, or to extensions thereof, I secure a fixed front guard 15 which extends entirely across the machine. This fixed guard 15 is braced to the side frames 1 or their extensions (Fig. 1) and forms a brace for the frame as well as a buffer therefor. Each frame 1, or extension thereof, is bent downward at its front end to a level of about that of the hubs of the wheels 3, and at their lower ends are secured the vertical pivots 16. The feelers 17 are mounted on these pivots 16 and extend out from the pivots in front of the wheels 3, being set a sufficient distance in front thereof so that they may have sufficient movement on the pivots to actuate the mechanisms controlling the machine. The feelers 17 also extend inward from the pivots 16. The rods 18 are secured at the inner ends of the feelers 17. At a suitable place on the machine, in this case to the rear of the engine fly-wheel, the two cross-bars 20 and 21 are mounted in suitable brackets 19 secured to the frames 1. The left-hand feeler rod 18 extends from the inner end of the left-hand feeler 17 and is secured at its rear end to the lever 22 mounted on the upper cross-bar 20 in such manner that when the outer end of the feeler 17 is forced toward the rear by engaging an obstruction and the inner end is correspondingly forced forward, the rod 18 secured thereto will pull the lever 22 so as to turn the cross-bar 20 on its axis. On this upper cross-bar 20 are mounted devices for releasing the friction clutch 14 and for applying the brakes 11 and for turning the steering post 10 so as to steer the wheels 3 toward the right. Similarly the right-hand rod 18 extends from the inner end of the right-hand feeler 17 and is secured at its rear end to the lever 23 mounted on the lower cross-bar 21 in such manner that when the rod 18 is similarly pulled it will pull the lever 23 and turn the cross-bar 21 on its axis. The cross-bar 21 is provided with devices for releasing the friction clutch 14, for applying the brake 11, and for turning the steering post 10 so as to steer the wheels 3 to the left.

Now coming to the second set of mechanisms above mentioned, namely the mechanism operated by the above described means, whereby the machine is steered away from the side which has engaged the obstruction. The steering post 10 passes through the frame or box 24, secured to the machine in suitable manner, and has mounted on it and within the box 24 the small sprocket wheel 25. At the other end of the box is mounted a similar sprocket idler wheel 26. Between the wheels 25 and 26 is mounted the chain which consists of a sprocket portion 27 at each end adapted to be engaged by the said sprocket wheels 25 and 26, and two long intermediate links 28 which are of extra length and which are provided with suitable longitudinal slots 29. On each side of the box 24, extending from a point near the middle toward the rear, is a slot 30. On the upper cross-bar 20 is mounted, to the right of the box 24, the lever 31 and a similar lever 32 is mounted on the lower cross-bar 21 to the left of the box 24. A rod 33 is mounted on the end of the lever 31 and passes therefrom beside the box 24. A clutch block 34 is loosely mounted on the end of the rod 33 and passes through the slot 30 in the box 24 and through the slot 29 in the right hand long link 28. This clutch block 34 passes through the said slot 29 without touching the sides thereof or in any way interfering with the free action of the link 28, so that as the machine is steered by the steering post 10 the sprocket gears 25 and 26, and chain 27 and 28 will move freely with the motion of the steering post 10 without causing any motion in the clutch block 34 or any part connected thereto. In order to insure this condition I have provided a pair of lugs 35 on the sides of the box 24, near the middle thereof, on which the clutch block 34 rests, and two small retarding pins 36 are secured in and extend upward from the upper sides of each of these lugs 35. The retarding pins 36 engage in corresponding depressions in the lower side of the clutch block 34. The position of the retarding pins 36 is such that they engage the block 34 between the connecting rod 33 and the long link 28. These pins serve to keep the clutch block in its normal disengaged position so long as the rod 33 is not pulled, but as soon as it is pulled they cause the block 34 to lag behind the rod 33. The clutch block 34 after passing through the slot 29 of the link 28, as above described, is provided with a head or enlargement on the inner end thereof, so that when the block is turned from its normal position on account of the lag, above mentioned, it grips the said link 28 between this head or enlargement and its main body and these parts are so formed (Figs. 4, 5, and 6) that they only engage the link 28 when they are caused to lag. Of course the retarding pins 36 do not hold the block 34 at this time but simply serve to insure its clutching the link 28, and then it easily slips off them. The block 34 thus clutches the link 28 and pulls it with it thus steering the wheels 3 to the right. When the wheels 3 have been turned by this means to their full extent then the block slips on the link 28 to the end of the slot 29 therein, the friction between the engaging surfaces of the clutch block 34 and the link 28 being capable of resisting a force only slightly greater than is needed to turn the steering wheels suddenly. Similarly the lever 32 to the left of the box 24 is provided with a connecting rod 37 having a clutch block 38 which is the complement of the above described block 34 and is similar to it and acts in a similar manner, engaging the left hand link 28 of the sprocket gears so that when it is actuated by the turning of the lower cross-bar 21, it will clutch and pull the left hand link to turn the steering wheels to the left. Now as above mentioned the right-hand feeler 17 operates the lower cross-bar 21 which, as just described, steers the wheels 3 to the left away from the right side, and similarly the left hand feeler 17 operates the upper cross-bar 20 which steers the wheels 3 to the right away from the left side of the machine.

Now taking up the third set of mechanisms above mentioned I will describe the means for releasing the friction clutch 14 which connects the engine 13 to the transmission mechanism by means of which the machine is driven. The friction clutch 14 is located next to the fly-wheel 39 of the engine 13 and is of any of the forms at present in use. In the drawings I have shown the foot lever 40 which controls the friction clutch 14 as adapted to release the friction connection when it is pressed forward by the foot of the operator. I extend downward a portion of each of the prongs 41 and pins or lugs are formed on the lower ends thus extended. On the upper cross-bar 20 is secured a lever 42 to the end of which is connected the rod 43 which has a long slot in its end in which the pin or lug on the end of one of the prongs 41 engages, so that if the foot lever 40 is pressed the said pin will slide in the said slot in the rod 43 and so that if the cross-bar 20 is turned it will pull the prong 41 through the agency of the lever 42 and the rod 43. Similarly a lever 44 is secured to the lower cross-bar 21 and a connecting rod 45 is secured to its upper end. This rod 45 is also provided with a slot in which the pin or lug of the other prong 41 engages. Thus the friction clutch 14 is disengaged when either of the cross-bars 20 or 21 are actuated by their corresponding feelers 17.

Finally, the fourth set of mechanisms by means of which the brake is applied to the driving wheels, consists of the levers 46 and 47 secured respectively to the upper and lower cross-bars 20 and 21 connected respectively by the rods 48 and 49 to the lever 50 which is secured in the usual manner to the hand lever 12 and which applies the brakes when it is pulled forward either by the hand lever 12 being pulled toward the rear or by the rods 48 or 49 being pulled by the levers 46 or 47 under the action of either of the cross-bars 20 or 21 as above described. The connecting rods 48 and 49 are each slotted so hand lever 12 and which applies the brakes without moving either of the said cross-bars 20 or 21. A ratchet 51 is engaged by the hand lever 12 so that when the brake is applied by the above automatic mechanism the brakes 11 will be held in the applied position.

Having described my invention, what I claim is,

1. In a device of the class described, the combination with the frame of an automobile; of a pair of bars or feelers pivoted to said frame and extending in front of each front wheel; a pair of cross-bars rotatively mounted on the frame and each operatively connected with one of the feelers; and pairs of means mounted on and operated by said cross-bars whereby the course and force of the automobile is controlled by either of the feelers.

2. In a device of the class described, the combination with a steering post operatively connected to the steering wheels of the automobile and normally operated by a hand wheel mounted thereon; means mounted on the steering post and moving therewith and adapted to turn the steering post in one direction or the other when actuated; two sets of means, normally disengaged from said turning means, but each adapted to automatically engage and actuate the turning means; and two bars or feelers mounted in front of and to each side of the automobile and each operatively connected to one of said actuating sets whereby when either of said feelers is engaged by an obstruction it operates the actuating means which engages and operates the turning means to turn the steering post and steer the automobile away from the side thus engaged.

3. In a device of the class described, the combination with a steering post operatively connected to the steering wheels of the automobile and normally operated by the hand wheel mounted thereon; means mounted on the steering post and moving therewith and adapted to turn the steering post in one direction or the other when actuated; means normally disengaged from said turning means but adapted to engage and actuate the turning means, independently of the course controlled by the hand wheel, to one extreme direction or the other and adapted to slip on said turning means if the engaging means has excess motion; and a pivoted bar or feeler mounted on the automobile and adapted to actuate said engaging means to cause the engaging means to actuate the turning means to steer the automobile away from the side when said bar has been engaged by an obstruction.

In testimony whereof I affix my signature in presence of two witnesses.

MORTIMER A. HOWE.

Witnesses:
 M. F. McNEIL,
 B. V. PIERCY.